United States Patent [19]

Gibson et al.

[11] Patent Number: 4,968,002

[45] Date of Patent: Nov. 6, 1990

[54] BOLTLESS BONNET ASSEMBLY FOR GATE VALVE

[75] Inventors: Henry B. Gibson, Beaumont, Tex.; Roland L. Larkin, Gardendale; Jerry T. Mann, Birmingham, both of Ala.

[73] Assignee: American Cast Iron Pipe Company, Birmingham, Ala.

[21] Appl. No.: 346,696

[22] Filed: May 3, 1989

[51] Int. Cl.$^5$ ................................................. F16K 3/00
[52] U.S. Cl. ...................................... 251/266; 251/329
[58] Field of Search .......................... 251/266, 329, 367

[56] References Cited

U.S. PATENT DOCUMENTS

| | | | |
|---|---|---|---|
| 2,541,968 | 2/1951 | Laurent | 251/70 |
| 2,582,996 | 1/1952 | Laurent | 251/329 |
| 3,060,964 | 10/1962 | Bagwell | 251/329 X |
| 3,068,901 | 12/1962 | Anderson | 251/329 X |
| 3,497,177 | 2/1970 | Hulsey | 251/172 |
| 3,658,087 | 4/1972 | Nelson | 137/454.6 |
| 3,770,247 | 11/1973 | Nelson | 251/282 |
| 3,938,779 | 2/1976 | Benjamin | 251/268 |
| 4,225,115 | 9/1980 | Miller | 251/327 |
| 4,373,700 | 2/1983 | Buchta | 251/214 |
| 4,431,163 | 2/1984 | Barbe | 285/305 X |
| 4,436,283 | 3/1984 | Shore | 251/329 X |
| 4,699,359 | 10/1987 | David | 251/329 |

OTHER PUBLICATIONS

Euro-20 Product Brochure; Pont-a-Mousson, S.A., date unknown.

*Primary Examiner*—John C. Fox
*Attorney, Agent, or Firm*—Kerkam, Stowell, Kondracki & Clarke

[57] ABSTRACT

A boltless bonnet assembly is provided for use with a valve, particularly a gate valve having a valve body comprising an upper housing, a lower fluid passageway, a gate, and a valve stem having a thrust washer. The bonnet assembly has a bonnet with a lower plate adapted to sealingly engage an underside of a lip of the upper housing, the lip defining an opening in the upper housing, and a cylindrical neck having inner and outer sets of threads at an upper portion. A bonnet clamp or alternatively a lock ring and clamp ring are provided to engage the outer threads of the bonnet to clamp the plate tightly against the underside of the lip, and a bonnet cover is provided for retaining the thrust collar of the valve stem in a recess in the bonnet, the bonnet cover being threaded into the set of inner threads of the bonnet. The bonnet cover is further provided with a seal flange and associated gasket which is compressed between the flange and an upper surface of the bonnet neck to seal the threaded connections from an outside environment.

25 Claims, 4 Drawing Sheets

FIG_5

BOLTLESS BONNET ASSEMBLY FOR GATE VALVE

BACKGROUND OF THE INVENTION

1. Field of the Invention

The present invention relates to gate valves, and more particularly to a boltless bonnet structure for gate valves.

2. Description of Related Art

Heretofore, various designs have been used and proposed for use in fastening a gate valve bonnet to the valve body. Traditionally, a bonnet has been fastened by providing the valve body and the bonnet with complementary bolt-through flanges and a plurality of bolt and nut fasteners extending therethrough.

More recently, certain designs have come forth wherein the bonnet is fastened without the use of bolts. Examples of such designs can be found in U.S. Pat. No. 4,431,163, in the name of Pierre Barbe and assigned on its face to Pont-a-Mousson, S. A. and a further design employed in a gate valve marketed by Pont-a-Mousson under the trademark "EURO-20". Both of these valves avoid the problems, primarily corrosion-related, associated with the use of bolted connections for gate valve bonnets. These bonnet designs, however, both suffer from certain drawbacks which detract from their desirability for use.

The design disclosed in the Barbe patent requires complementary grooves to be provided in mating edges of the bonnet or cover, and the upper housing of the valve into which cylindrical locking pins are inserted. This design enables access to the valve stem upper seals without danger of the bonnet dropping into the valve body; however, when removal of the bonnet is desired to gain access to the interior of the valve body, the locking pins must first be removed. This may be a most difficult task, particularly when the valve is installed in a line.

The EURO-20 gate valve design employs a bonnet-to-valve body connection which provides threaded members which are more easily connected and disconnected. That design suffers the disadvantage that in order to gain access to the valve stem upper O-ring seals, components must be removed which leave the bonnet in danger of coming unseated, and dropping out of position into the interior of the valve body.

One further example of a "boltless" bonnet is disclosed in U.S. Pat. No. 4,699,359, in the name of Walfried David, and assigned on its face to Bopp & Reuther, GmbH. The gate valve in this patent employs a threaded-type connection for the bonnet structure wherein a supporting ring having two supporting legs extending downwardly to the valve body is clamped in place by a collar on a locking screw. The bonnet structure in this patent suffers from the same disadvantage as the aforementioned EURO-20 valve in that the bonnet could unseat and drop when an attempt is made to gain access to the upper part of the valve stem.

It is therefore an important object of the present invention to provide a gate valve having a boltless bonnet connecting structure which substantially eliminates the possibility of having the bonnet drop while accessing the upper portion of the valve stem.

It is a further object of the present invention to provide a bonnet having threaded connections for fixing the bonnet in place within the valve body which also provides isolation of the threads from corrosive environments.

It is another object of the present invention to provide a gate valve design wherein the upper valve stem O-ring seals are accessible for maintenance without disrupting the integrity of the valve body-to-bonnet seal.

SUMMARY OF THE INVENTION

The above and other objects of the present invention are accomplished by a gate valve structure wherein the bonnet sealingly engages the valve body at an underside of a lip portion of the valve body, the lip portion defining an opening at the top of the gate valve. The bonnet, which has a lower portion which is roughly in the shape of a ellipse (looking down at the gate valve), to close off a similarly shaped opening at the top of the valve body, has a cylindrical neck extending upwardly from the elliptical cover portion.

The cylindrical neck has a narrow opening therethrough allowing a valve stem to extend from the gate disposed in the valve body upwardly through the bonnet to a means for operating the gate. The neck has a wider opening at its upper extent above the narrow opening and the inner and outer surfaces of the top portion of the neck are threaded.

A bonnet clamp sized to slip over the cylindrical neck to engage the upper surface of the lip portion of the valve body, is threaded down on the exterior threads of the neck into abutting engagement with the valve body, thereby clamping the elliptical portion of the bonnet against the underside of the lip portion of the valve body.

A bonnet cover is provided which is adapted to be threaded into the inner threads of the cylindrical neck once the bonnet clamp has been installed on the bonnet assembly. The lower surface of the bonnet cover serves to retain the valve stem in a substantially fixed vertical position by forming a barrier across a square recess in the cylindrical neck, the recess housing a circular thrust collar which protrudes radially from the valve stem. A square thrust washer above and below the thrust collar prevents unwanted rotation of the bonnet cover as the stem is rotated. The recess is of sufficient size to permit the thrust collar to rotate therein when the stem is turned while preventing rotation of the thrust washers. The depth of the recess is substantially equal to a thickness of the thrust collar and thrust washers, and the thrust collar is prevented from moving in a vertical direction.

The bonnet assembly is further provided with seats and elastomeric seals or gaskets to be retained in the seats for isolating the threaded connections from the potentially corrosive exterior and interior environment.

BRIEF DESCRIPTION OF THE DRAWINGS

These and other features of the present invention and the attendant advantages will be readily apparent to those having ordinary skill in the art and the invention will be more easily understood from the following detailed description of the preferred embodiments of the present invention taken in conjunction with the accompanying drawings wherein like reference characters represent like parts throughout the several views, and wherein.

DETAILED DESCRIPTION OF THE PREFERRED EMBODIMENTS

Figure 1:
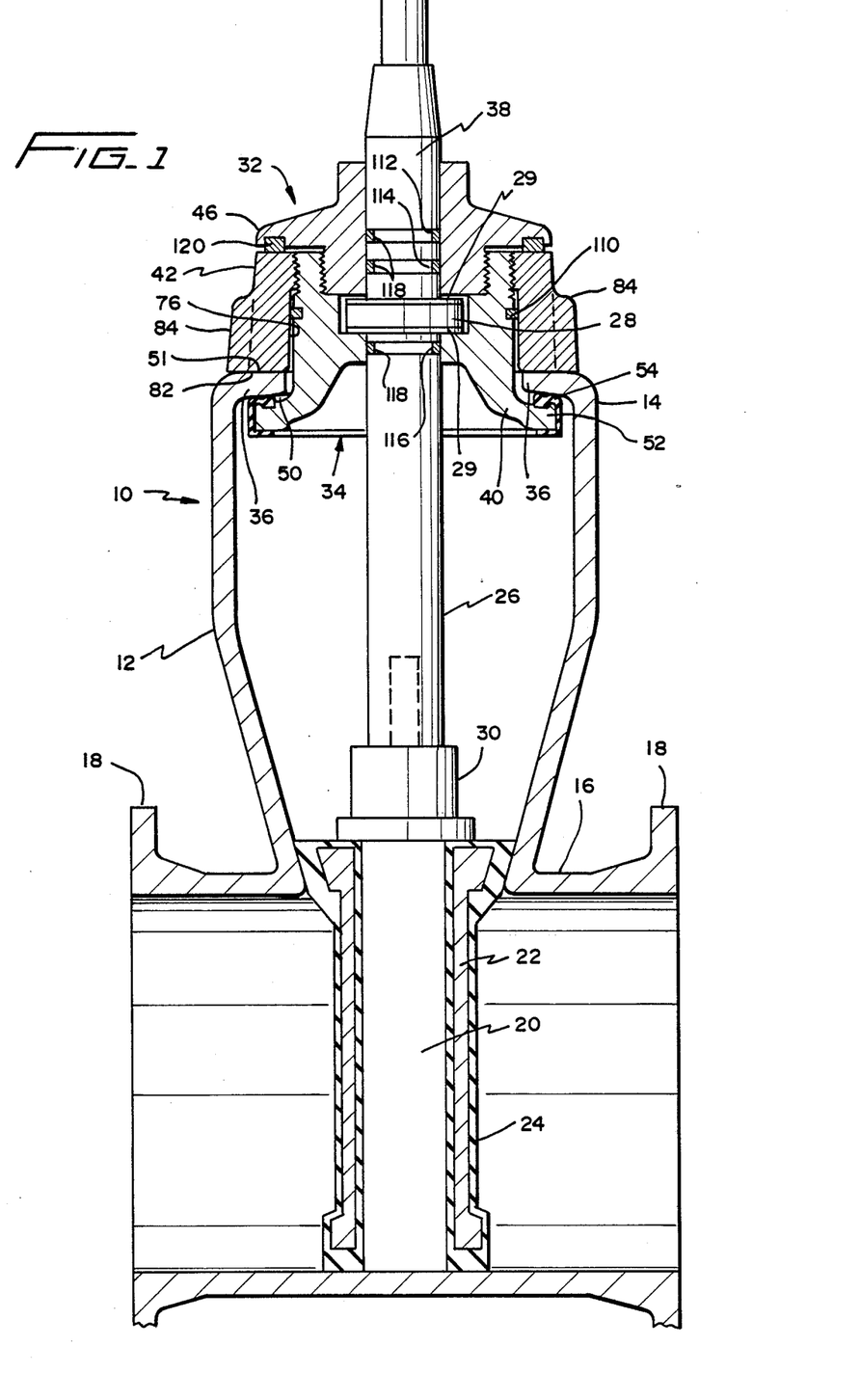
FIG. 1 depicts a cross-sectional view of a gate valve employing the bonnet assembly according to a preferred embodiment of the present invention.

Referring initially to FIG. 1, a cross-section of a gate valve 10 according to a preferred embodiment of the present invention is shown. One basic component of the gate valve is the valve body 12 made up of upper housing 14 and lower fluid passageway 16. Fluid passageway 16 is bounded at each end by any suitable means for connecting to lines for transporting fluids, FIG. 1 showing flanges 18 as an example. The gate valve 10 houses a gate 20 having an iron core 22 and rubber coating 24, the gate being connected at one end to a lower end of valve stem 26. As used herein, words describing the relative orientation of components, such as "upper", "lower", "vertical", and the like, refer only to the valve as it is positioned in FIG. 1. The valve may, however, be installed at many different orientations, and it is not intended that the invention be limited to a valve operable only in this "upright" position.

Gate 20 is adapted to be raised into upper housing 14 and lowered into fluid passageway 16 when valve stem 26 is rotated in one direction or the other and thus open or close the fluid passageway, as the case may be. The gate valve 10 depicted in FIG. 1 is of the "non-rising stem" type, which is generally known in the art. The valve stem used in such a gate valve has a thrust collar 28 rotatably housed in an upper portion of a bonnet, and the lower portion of the valve stem 26 is threaded (not shown) to engage an internally threaded non-rotatable hollow T-nut 30 attached to gate 20 such that the gate will move vertically into and out of the passageway and with respect to valve stem 26 in response to the rotation of the valve stem. Thrust collar 28 is advantageously provided with, at an upper and lower surface thereof, thrust washers 29, a practice known in the art. Hereinafter the thrust collar and associated washers will be referred to collectively as collar 28.

Looking now at FIGS. 2a–c, 3 and 4 in combination with FIG. 1, the upper housing 14 and bonnet assembly 32 according to a preferred embodiment of the present invention will be described. Upper housing 14 has an approximately elliptical opening 34 (FIG. 4) at an upper extent thereof, which is shaped and sized such that the gate 20, also substantially elliptical in plan view, may be inserted into proper position during assembly and removed when disassembly is required. Opening 34 is defined and bounded by an inwardly extending lip 36 of upper housing 14. It is to be recognized that when terms such as "ellipse", "elliptical" and "approximately elliptical", are used herein, the terms refer to shapes which are symmetrical about axes of two different lengths, such as that shown for opening 34 in FIG. 4, wherein a major axis A and a minor axis B of the opening are shown.

A primary purpose of the bonnet assembly 32 is to seal off the opening 34 from the external environment, and to provide means for allowing an upper portion 38 of valve stem 26 to be accessed by a valve operator. Bonnet assembly 32, in the FIG. 3 preferred embodiment, comprises three principal components: bonnet 40, bonnet clamp 42, and bonnet cover 46.

Figure 2A:
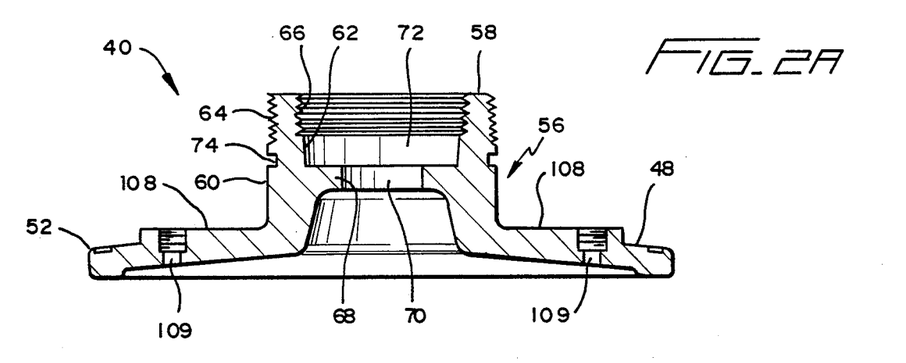
FIGS. 2a, b, c, depict, respectively, a cross-sectional view of the bonnet of the present invention taken along section line 2A of FIG. 2c; a cross-sectional view taken along section line 2B of FIG. 2c; and a top plan view of the bonnet of the present invention.
Figure 2B:
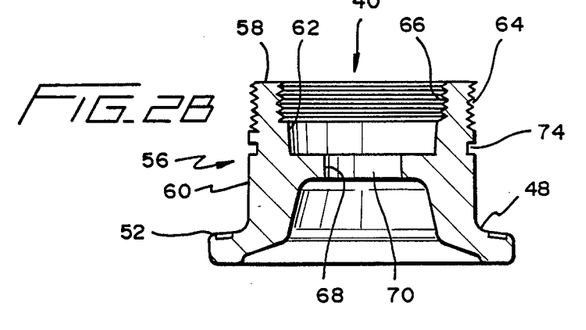
Figure 2C:
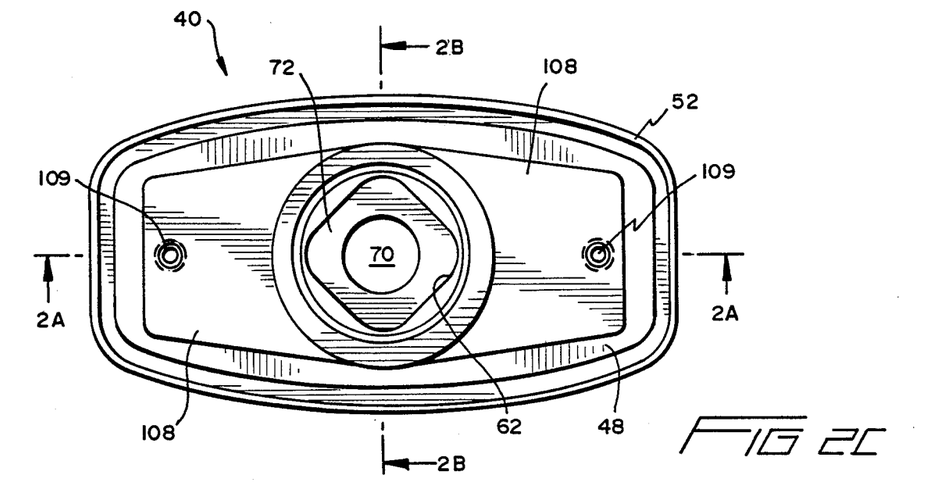

Bonnet 40 is best depicted as an individual component in FIGS. 2 a–c. Bonnet 40 has a lower plate 48 for engaging the valve body, which is of substantially the same shape as opening 34, only plate 48 is longer and wider than the opening. Bonnet 40 is thus inserted at an angle through opening 34 and then brought upwardly into engagement with the underside 50 of lip portion of the upper housing 14. As can be seen in FIGS. 1 and 2, the rim 52 of plate portion 48 is grooved to provide a seat for sealing gasket 54 which extends from a top side of the rim 52 around the periphery of the plate 48 to an underside of the rim. The gasket 54 is adapted to be compressed between underside 50 of lip 36 and rim 52 when the bonnet assembly is completed, thereby being adapted to seal opening 34.

Extending integrally upwardly from plate portion 48 is a cylindrical neck 56 having an upper surface 58. Extending downwardly from the upper surface along a portion of an outer surface 60 and an inner surface 62 of neck 56, respectively, are a set of outer threads 64 and a set of inner threads 66. The function of these threads will be discussed at a later point in this specification.

An inwardly extending flange 68 having a bore 70 extending therethrough is located in the interior of neck 56 and is spaced apart from the set of inner threads 66, leaving a substantially square recess 72 area bounded on its lower side by an upper surface of the flange 68 and at its periphery by the inner surface 62 of the neck. This recess is preferably of a depth (vertical extent in FIG. 1) sufficient to surround the bottom and sides of thrust collar 28 as depicted in FIG. 1. Although the recess is shown as being substantially square in shape, the recess may be made in other non-circular shapes, with the thrust washers 29 being made in a corresponding shape.

The outer surface 60 of neck 56, at a position below the set of outer threads 64, has an annular notch 74 which may be rectangular or square in cross-section, and which is adapted to receive an elastomeric ring-type seal.

Bonnet clamp 42 is a substantially annular member having a lower portion and an upper portion, the inner surface 76 of the lower portion being smooth (i.e. not threaded) and the inner surface 78 of the upper portion is tapped or threaded. Bonnet clamp 42 also has substantially planar top and bottom surfaces 80, 82 respectively. The threaded upper inner surface 78 has a slightly smaller diameter than the smooth lower inner surface 76. Lower inner surface 76 is to be sized such that it is capable of slipping over neck 56 of bonnet 40 without interference. The diameter of the threaded upper inner surface 78 is of a size whereby the threads 84 of surface 78 will threadingly engage the set of outer threads 64 of bonnet 40.

The overall length of bonnet clamp 42 must be sufficient to allow bottom surface 82 to clampingly engage an upper surface 51 of lip portion 36 of upper housing 14 when the threaded upper inner surface 76 is threaded down onto outer bonnet threads 64. As shown in FIG. 1, bottom surface 82 will engage the lip portion 36 of upper housing 14 across the minor axis B (FIG. 4) of the opening 34. Preferably, the top surface 80 of the bonnet clamp 42 will be substantially flush with upper surface 58 of cylindrical neck 56 when the bonnet clamp 42 is tightened down to clamp itself and bonnet 40 against the upper and lower sides of lip portion 36.

Figure 3:
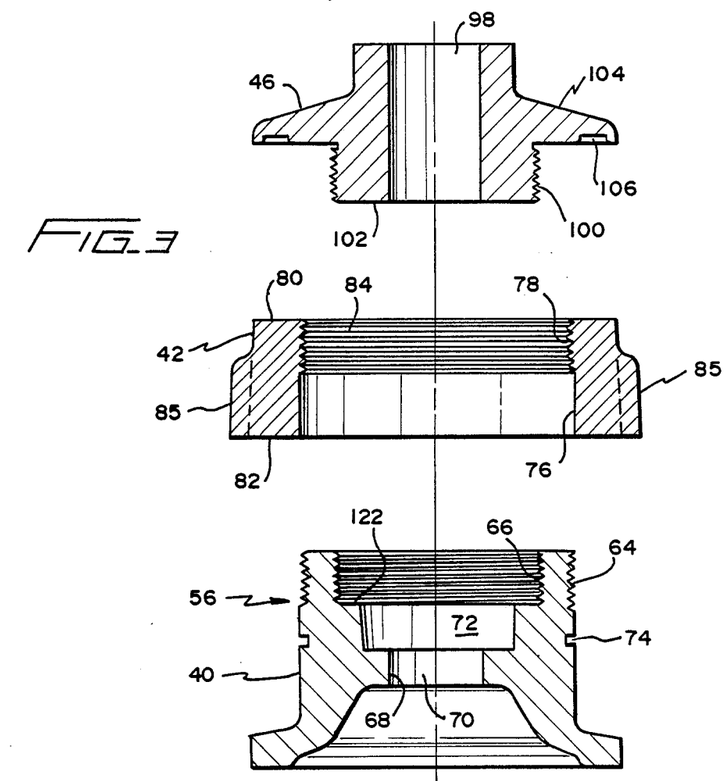
FIG. 3 depicts an exploded cross-sectional view of three major components of the bonnet assembly of the present invention.
Figure 4:
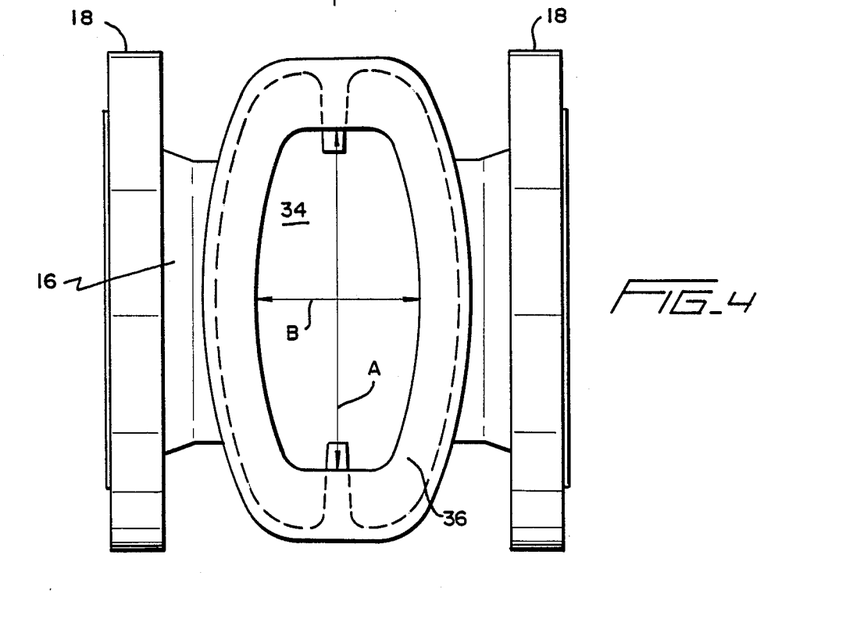
FIG. 4 depicts a top plan view of the valve body portion of the gate valve of the present invention.

Bonnet clamp 42 also preferably has a plurality of radially extending lugs 85, two of which are shown in FIGS. 1 and 3, which are provided to assist in threading and tightening the bonnet clamp in position in constructing the bonnet assembly. Two, three, or more lugs may be employed, as desired.

Bonnet cover 46 is preferably of an approximately cylindrical shape having a bore 98 therethrough which is sized to be in close-fitting relation to the upper portion 38 of valve stem 26. Bonnet cover 46 carries a set of exterior threads 100 extending upwardly from a lower surface 102 of the bonnet cover, the outer diameter of the threads on the exterior surface of the cover 46 being sized to be capable of threadingly engaging the set of inner threads 66 of bonnet 40.

Bonnet cover 46 further preferably has a radial seal flange 104 extending radially outwardly from the cover at a position above an upper extent of threads 100. Radial seal flange 104 preferably has an annular seal seat 106 disposed on its downwardly facing surface. The seat 106 is to be sized such that it will be positioned directly vertically above the top surface 80 of bonnet clamp 42 when all components of the bonnet assembly 32 are aligned (see FIG. 3).

Having thus identified the basic components of bonnet assembly 32, it is now possible to describe the operations involved in constructing the assembly. Bonnet 40 is first inserted through opening 34 in upper housing 14 of the valve body by tilting the bonnet with respect to a "plane" defined by the opening, and once inserted, is realigned such that the rim 52 of plate 48 is substantially completely in contact with or in close proximity to lower side 50 of lip 36. It may be noted at this point, with reference to FIGS. 2 a-c, that an upwardly extending positioning surface 108 is provided on the upper surface of plate 48, and is located and sized to provide only a small clearance between the surface 108 and the lip portion 36 defining opening 34. Thus, if the bonnet is more than slightly out of alignment, the surface will not permit the bonnet to be brought into close proximity of the underside of the lip, and will alert the person building up the assembly that the bonnet requires better alignment. The positioning surface, once properly positioned, will also aid in preventing rotation of the bonnet 40 when further operations are performed.

Positioning surface 108 may advantageously be drilled and tapped to form one or more, and preferably two bores 109 extending through the plate 48. These bores 109 may be used for expulsion of air at testing and may be used to aid in the assembly of the valve by providing means inward of the rim 56 to grip or hold the bonnet 40.

A ring-type elastomeric seal 110, such as an O-ring, is positioned in seat 74, either prior to positioning the bonnet 40 in opening 34, or after positioning and prior to threading bonnet clamp onto cylindrical neck 56. Once bonnet 40 has been properly positioned, the lower portion of bonnet clamp 42 is slipped over cylindrical neck 56, and the upper portion is then threaded down on external threads 64 of the neck 56. Bonnet clamp 42 is threaded down into engagement with the upper surface 51 of lip portion 36 of the valve body, and is tightened further to draw the bonnet plate 48 upwardly toward opening 34, thus compressing gasket 54 between the rim 52 and lip 36 to effect a high integrity seal. As bonnet clamp 42 is threaded down into final position, elastomeric seal 110 is compressed between the lower inner surface 76 of the bonnet clamp and the seat 74 on the exterior surface of the cylindrical neck.

Valve stem 26 must be inserted through bore 70 in bonnet 40 into threaded engagement with T-nut 30 of gate 20 prior to installation of bonnet cover 46. This may advantageously be done at the same time as the alignment of the bonnet in the opening, or may be accomplished after the bonnet clamp 42 is installed. In any event, valve stem 26 is provided with three annular seal seats 112, 114, 116, two of which (112, 114) are disposed on the upper portion of the valve stem which extends from a top of the stem to the thrust collar 28. The third seal seat 116 is disposed such that it will be located at the level of the flange 68 having the bore 70 therethrough, such that a substantially leak-proof seal is provided at that location. Elastomeric ring-type seals such as O-ring seals 118 are provided in each of these seal seats prior to the valve stem being positioned in the valve body. The valve stem is properly positioned when it has engaged the T-nut 30 at the top of the gate 20, and when thrust collar 28 comes to rest on flange 68 in recess 72.

Once valve stem 26, and bonnet clamp 42 have been positioned, bonnet cover 46 and an elastomeric gasket 120 may be slipped over the top of the valve stem, and cover 46 may be threaded into the inner surface threads 66 of bonnet 40. The assembly is preferably designed such that the lower surface 102 may be threaded into abutting engagement with the top surface 122 of recess 72, this abutment preferably occurring prior to the lower surface of radial flange 104 "bottoming out" on either the upper surface 58 of cylindrical neck 56 or the top surface 80 of bonnet clamp 42. This is accomplished by designing the portion of the bonnet cover extending downwardly from radial flange 104 to be slightly longer than the length of the set of inner threads 66. In this manner, gasket 120 will be compressed into seat 106 by bonnet clamp 42, sealing off the upper interior portions of the bonnet assembly 32 from the external environment. Further, thrust collar 28 is confined in recess 72, with lower surface 102 of bonnet cover 46 prohibiting vertical upward movement of the valve stem. If desired, annular thread relief recesses (not shown) may be provided at the region where threads 66 meet top surface 122 of recess 72, and at the region where threads 100 meet the lower surface of radial flange 104.

When bonnet cover 46 is threaded into position, the ring-type seals, or O-rings 118, installed in seats 112, 114 at the upper portion 38 of valve stem 26 are compressed into the seats to provide a high-integrity seal between the bore 98 of bonnet cover 46 and the upper portion of the valve stem. One important advantage of the bonnet assembly over prior art bonnet assemblies is that these upper O-rings may be changed out during routine maintenance without fear of the bonnet plate 48 losing its seal with lip 36 of opening 34. When bonnet cover 46 is unthreaded and removed, the O-rings in seats 112, 114 are accessible, while the bonnet clamp continues to positively retain the bonnet 40 in place.

Figure 5:
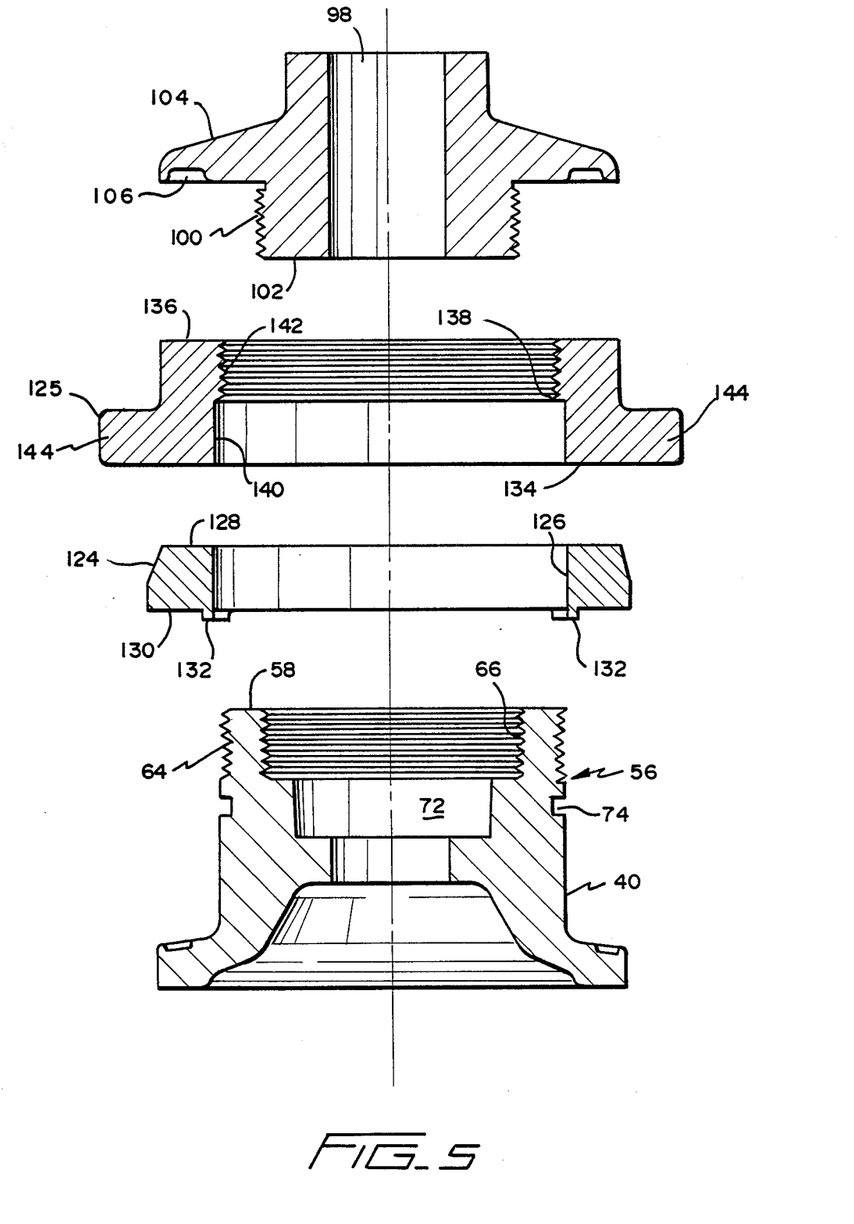
FIG. 5 depicts an exploded cross-sectional view of four major components of an alternative preferred embodiment of the bonnet assembly.

An alternate preferred embodiment of the bonnet assembly 32 of the present invention is depicted in FIG. 5. In that figure, the one-piece bonnet clamp 42 of the previous embodiment is replaced by a two piece arrangement comprising a clamp ring 124 and a lock ring 125.

Clamp ring 124 is an annular member having a smooth (i.e., not threaded) inner surface 126, a substantially planar upper surface 128, and a lower surface 130 which is substantially flat. Optionally, two locking lugs 132 may extend downwardly therefrom. These lugs 132 are preferably adapted to wedge into the gap between opening 34 and bonnet 40 (FIG. 1) and are adapted to restrict rotation of the clamp ring with respect to lip 36. Clamp ring 124 is sized such that the ring will be able to slip over neck 56 of bonnet 40 without interference, and also such that the lower surface 130 of the ring 124 will rest on and be capable of clampingly engaging the upper surface 51 of lip portion 36 across the minor axis B (smaller dimension) of opening 34, in a manner, substantially identical to the FIG. 1 bonnet clamp.

The lock ring 125 of the FIG. 5 embodiment has a substantially planar lower surface 134 adapted to engage, in an abutting manner, the upper surface 128 of clamp 124. Lock ring 125 further has a substantially planar upper surface 136.

An inner surface 138 of the lock ring comprises two sections, a lower section 140 which has a smooth (untapped, unthreaded) surface of approximately the same diameter as inner surface 126 of clamp ring 124, and an upper section 142, which is tapped or threaded, this upper section 142 having a diameter somewhat smaller than lower section 140, being sized to be capable of engaging the set of outer threads 64 of bonnet 40 when brought into position on the bonnet assembly 32. Lock ring 125 further comprises a plurality of radially extending lugs 144, two of which are shown in FIG. 5, which are provided to assist in threading the lock ring into position in constructing the bonnet assembly. Two, three, or more lugs may be employed, as desired.

The valve assembly procedure for the FIG. 5 embodiment is nearly identical to that of the FIG. 3 embodiment, the primary difference being that the clamp ring may be set in place and the lock ring is subsequently threaded into abutment with the clamp ring to clampingly engage the bonnet in the valve body opening.

While the bonnet assembly of the present invention has been illustrated and described in a preferred embodiment in use with a gate valve, various modifications and structural changes may become readily apparent to those skilled in the art, without departing in any way from the spirit of the present invention. Accordingly, the scope of the present invention is to be determined by the appended claims.

We claim:

1. A gate valve comprising:
    a valve body having an upper housing, a lower fluid passageway, a gate disposed in said valve body, and a valve stem connected to said gate and extending upwardly through said upper housing, said valve stem adapted to move said gate between a closed position wherein said gate blocks an entirety of said fluid passageway and a fully open position wherein said gate is substantially removed from said fluid passageway, said valve stem further having a thrust collar extending radially outwardly therefrom;
    said upper housing having an inwardly extending lip portion defining an opening in said upper housing at an upper extent thereof to receive said gate and said valve stem therethrough when said valve is assembled, said lip having an underside and an outer surface;
    a bonnet comprising a lower plate and an integral hollow cylindrical neck extending upwardly therefrom, said lower plate being so constructed and arranged to engage said underside of said lip when said lower plate is inserted and aligned in said upper housing, said neck having an annular upper surface, an outer set of bonnet threads extending downwardly for a predetermined distance from said upper surface along an outer surface of said neck, an inner set of bonnet threads extending downwardly for a predetermined distance from said upper surface along an inner surface of said neck, said bonnet further having a flange extending radially inwardly from said inner surface of said neck at a position below said inner set of threads, said flange having a central bore allowing said valve stem to extend therethrough, an upper surface of said flange being adapted to engage said thrust collar in an abutting manner;
    means for clamping said bonnet to said underside of said lip, said bonnet clamping means comprising ring means having an inner surface having inner threads at an upper portion thereof and a lower surface adapted to engage said outer surface of said inwardly extending lip of said upper housing;
    bonnet cover means for retaining said valve stem in a substantially fixed vertical position said bonnet cover means having a circular bore extending therethrough and adapted to be slidingly received on an upper portion of said valve stem above said thrust collar, said bonnet cover means having threads on an outer surface of a lower portion thereof, said threads being adapted to threadingly engage said inner set of threads of said bonnet;
    and said gate valve further comprising means for isolating said outer set of bonnet threads, said inner set of bonnet threads, said ring means inner threads, and said bonnet cover outer threads from an external environment.

2. A gate valve as defined in claim 1 wherein said ring means comprises a one-piece bonnet clamp having said threads at said upper portion.

3. A gate valve as defined in claim 2 wherein said opening in said upper housing has a substantially elliptical shape, and said plate of said bonnet has a shape substantially corresponding in geometry to said opening, said plate having greater length and width dimensions than said opening.

4. A gate valve as defined in claim 3 wherein said bonnet clamp is adapted to engage said outer surface of said lip at each side of a narrow dimension of said opening.

5. A gate valve as defined in claim 1 wherein said plate of said bonnet has a gasket disposed around a rim thereof, wherein said gasket is compressed between said rim and said underside of said lip.

6. A gate valve as defined in claim 1 wherein said plate of said bonnet has a positioning surface extending upwardly therefrom, said positioning surface having a peripheral edge shape conforming substantially in geometry to said opening in said upper housing.

7. A gate valve comprising:
    a valve body having an upper housing, a lower fluid passageway, a gate disposed in said valve body, and a valve stem connected to said gate and extending upwardly through said upper housing, said valve stem adapted to move said gate between a closed position wherein said gate blocks an entirety of said fluid passageway and a fully open position wherein said gate is substantially removed from said fluid passageway, said valve stem further having a thrust collar extending radially outwardly therefrom;

said upper ho using having an inwardly extending lip portion defining an opening in said upper housing at an upper extent thereof to receive said gate and said valve stem therethrough when said valve is assembled, said lip having an underside and an outer surface;

a bonnet comprising a lower plate and an integral hollow cylindrical neck extending upwardly therefrom, said lower plate being adapted to engage said underside of said lip when said lower plate is inserted and aligned in said upper housing, said neck having an annular upper surface, an outer set of bonnet threads extending downwardly for a predetermined distance from said upper surface along an outer surface of said neck, an inner set of bonnet threads extending downwardly for a predetermined distance from said upper surface along an inner surface of said neck, said bonnet further having a flange extending radially inwardly from said inner surface of said neck at a position below said inner set of threads, said flange having a central bore allowing said valve stem to extend therethrough, an upper surface of said flange being adapted to engage said thrust collar in an abutting manner;

means for clamping said bonnet to said underside of said lip, said bonnet clamping means comprising ring means having an inner surface having inner threads at an upper portion thereof and a lower surface adapted to engage said outer surface of said inwardly extending lip of said upper housing; and bonnet cover means for retaining said valve stem in a substantially fixed vertical position, said bonnet cover means having a circular bore extending therethrough and adapted to be slidingly received on an upper portion of said valve stem above said thrust collar, said bonnet cover means having threads on an outer surface of a lower portion thereof, said threads being adapted to threadingly engage said inner set of threads of said bonnet; and wherein said bonnet cover means further comprises a radially outwardly extending seal flange means, and an associated compressible gasket, said seal flange means having an annular seat adapted to retain said compressible gasket therein, said seat being disposed on a downwardly facing surface of said flange, said annular seat being disposed substantially directly above an upper surface of said bonnet clamping means and wherein said seal flange means is adapted to compress said gasket between said seat and said upper surface of said bonnet clamping means when said bonnet cover means is threaded into engagement with said bonnet.

8. A gate valve as defined in claim 7, wherein said valve stem further comprises at least one annular groove disposed above said thrust collar, said at least one groove retaining an associated ring-type seal therein, and wherein said bore extending through said bonnet cover means has a predetermined diameter wherein said ring-type seal is compressed into said groove when said bonnet cover means is threaded into engagement with said bonnet.

9. A gate valve as defined in claim 8 wherein said bonnet further comprises an annular seat and an associated ring-type seal retained therein, said seat being disposed on said outer surface of said neck at a position below said outer set of threads, and wherein said ring means is adapted to engage said ring-type seal at an outer periphery of said seal when said ring means is threaded into clamping engagement with said lip of said upper housing.

10. A gate valve comprising:

a valve body having an upper housing, a lower fluid passageway, a gate disposed in said valve body, and a valve stem connected to said gate and extending upwardly through said upper housing, said valve stem adapted to move said gate between a closed position wherein said gate blocks an entirety of said fluid passageway and a fully open position wherein said gate is substantially removed from said fluid passageway, said valve stem further having a thrust collar extending radially outwardly therefrom;

said upper housing having an inwardly extending lip portion defining an opening in said upper housing at an upper extent thereof to receive said gate and said valve stem therethrough when said valve is assembled, said lip having an underside and an outer surface;

a bonnet comprising a lower plate and an integral hollow cylindrical neck extending upwardly therefrom, said lower plate being adapted to engage said underside of said lip when said lower plate is inserted and aligned in said upper housing, said neck having an annular upper surface, an outer set of bonnet threads extending downwardly for a predetermined distance from said upper surface along an outer surface of said neck, an inner set of bonnet threads extending downwardly for a predetermined distance from said upper surface along an inner surface of said neck, said bonnet further having a flange extending radially inwardly from said inner surface of said neck at a position below said inner set of threads, said flange having a central bore allowing said valve stem to extend therethrough, an upper surface of said flange being adapted to engage said thrust collar in an abutting manner;

means for clamping said bonnet to said underside of said lip, said bonnet clamping means comprising ring means having an inner surface having inner threads at an upper portion thereof and a lower surface adapted to engage said outer surface of said inwardly extending lip of said upper housing; and bonnet cover means for retaining said valve stem in a substantially fixed vertical position, said bonnet cover means having a circular bore extending therethrough and adapted to be slidingly received on an upper portion of said valve stem above said thrust collar, said bonnet cover means having threads on an outer surface of a lower portion thereof, said threads being adapted to threadingly engage said inner set of threads of said bonnet; and wherein said ring means comprises a lower clamp ring and an upper lock ring, said lower clamp ring having a predetermined inner surface diameter wherein said clamp ring is adapted to be slipped over said neck into engagement with said outer surface of said lip without contacting said neck, and said lock ring comprises an upper internally threaded portion and a lower unthreaded portion, said unthreaded portion further having a lower surface adapted to engage an upper surface of said clamp ring in an abutting manner.

11. A gate valve as defined in claim 10 wherein said clamp ring has at least one downwardly extending lug adapted to be wedged in a gap between said cylindrical neck of said bonnet and said inwardly extending lip portion of said upper housing.

12. A gate valve as defined in claim 10 wherein said opening in said upper housing has a substantially elliptical shape, and said plate of said bonnet has a shape substantially corresponding in geometry to said opening, said plate having greater length and width dimensions than said opening.

13. A gate valve as defined in claim 12 wherein said clamp ring is adapted to engage said outer surface of said lip at each side of a narrow dimension of said opening.

14. A gate valve as defined in claim 13 wherein said clamp ring has a pair of downwardly extending lugs adapted to be wedged in a gap between said cylindrical neck of said bonnet and said inwardly extending lip portion of said upper housing.

15. A gate valve comprising:
a valve body having an upper housing, a lower fluid passageway, a gate disposed in said valve body, and a valve stem connected to said gate and extending upwardly through said upper housing, said valve stem adapted to move said gate between a closed position wherein said gate blocks an entirety of said fluid passageway and a fully open position wherein said gate is substantially removed from said fluid passageway, said valve stem further having a thrust collar extending radially outwardly therefrom;
said upper housing having an inwardly extending lip portion defining an opening in said upper housing at an upper extent thereof to receive said gate and said valve stem therethrough when said valve is assembled, said lip having an underside and an outer surface;
a bonnet comprising a lower plate and an integral hollow cylindrical neck extending upwardly therefrom, said lower plate being so constructed and arranged to engage said underside of said lip when said lower plate is inserted and aligned in said upper housing, said neck having an annular upper surface, an outer set of bonnet threads extending downwardly for a predetermined distance from said upper surface along an outer surface of said neck, an inner set of bonnet threads extending downwardly for a predetermined distance from said upper surface along an inner surface of said neck, said bonnet further having a flange extending radially inwardly from said inner surface of said neck at a position below said inner set of threads, said flange having a central bore allowing said valve stem to extend therethrough, an upper surface of said flange being adapted to engage said thrust collar in an abutting manner;
means for clamping said bonnet to said underside of said lip, said bonnet clamping means comprising ring means having an inner surface having inner threads at an upper portion thereof and a lower surface adapted to engage said outer surface of said inwardly extending lip of said upper housing;
bonnet cover means for retaining said valve stem in a substantially fixed vertical position, said bonnet cover means having a circular bore extending therethrough and adapted to be slidingly received on an upper portion of said valve stem above said thrust collar, said bonnet cover means having threads on an outer surface of a lower portion thereof, said threads being adapted to threadingly engage said inner set of threads of said bonnet;
wherein said plate of said bonnet has a positioning surface extending upwardly therefrom, said positioning surface having a peripheral edge shape conforming substantially in geometry to said opening in said upper housing; and
wherein said positioning surface has at least one tapped and threaded bore extending therethrough.

16. A bonnet assembly for a valve having an opening in an upper housing thereof, said valve further having a valve stem extending through said upper housing, the valve stem having a radially outwardly extending thrust collar disposed thereon, comprising:
a bonnet having a lower plate adapted to engage an underside of an inwardly extending lip of said inner housing, said lip having a peripheral edge defining said opening, said bonnet further having an integral cylindrical neck extending upwardly from said plate, said cylindrical neck having an outer surface, an inner surface and an upper surface, said outer surface having an outer set of threads disposed thereon extending downwardly along said outer surface for a predetermined distance from said upper surface, said inner surface having an inner set of threads disposed thereon extending downwardly along said inner surface for a predetermined distance from said upper surface, said inner surface further having a radially inwardly extending flange having a bore therethrough, said bore having a diameter sufficient to permit said valve stem to extend therethrough, said flange being disposed at a predetermined distance below a lower extent of said inner threads, an inner portion of said neck further having a recess spanning said distance between said lower extent of said threads and an upper surface of said flange, said recess being larger in size than a diameter of said bore, said recess being of a size sufficient to receive said thrust collar of said valve stem therein;
means for clamping said lower plate of said bonnet in sealed engagement with said underside of said lip, said clamping means comprising ring means having threads disposed on an upper portion of an inner surface of said ring means for engaging said outer threads of said neck of said bonnet, said ring means further having means for engaging an upper surface of said lip of said upper housing extending downwardly from said upper threaded portion, and
means for retaining said thrust collar of said valve stem within said recess in said bonnet thereby permitting said valve stem to be moved substantially only in a rotating manner, said retaining means comprising a bonnet cover means having a bore extending therethrough having a diameter slightly larger than a diameter of said valve stem, such that said bonnet cover means may be slipped over an upper portion of said valve stem, said cover means further having a lower external threaded portion adapted to engage and be threaded into said inner set of threads of said bonnet neck, said cover means further having a lower surface adapted to extend across atop portion of said recess in said neck of said bonnet when said bonnet cover means is threaded into said bonnet, thereby preventing upward movement of said thrust collar and said valve stem; wherein said valve stem of said valve further comprises at least one annular groove disposed above said thrust collar, said at least one groove retaining an associated ring-type seal therein, and wherein said bore extending through said cover means has a predetermined diameter wherein said ring-type seal is compressed into said groove when said cover means is threaded into engagement with said bonnet; and wherein said bonnet further comprises an annular seat retaining a ring-type seal therein, said seat being disposed on said outer surface of said neck at a position below said outer set of threads, and wherein said ring means is adapted to engage said ring-type seal at an outer periphery thereof when said ring means is threaded into clamping engagement with said lip of said upper housing.

17. A bonnet assembly as defined in claim 16 wherein said bonnet cover means further comprises a radially outwardly extending seal flange means, and an associated compressible gasket, said seal flange means having an annular seat adapted to retain said compressible gasket therein, said seat being disposed on a downwardly facing surface of said seal flange means, said annular seat being disposed substantially directly above an upper surface of said ring means, and wherein said seal flange means is adapted to compress said gasket between said seat and said upper surface of said ring means when said bonnet cover means is threaded into engagement with said bonnet.

18. A bonnet assembly as defined in claim 16 wherein said ring means comprises a one-piece bonnet clamp having said threads at said upper portion.

19. A bonnet assembly as defined in claim 18 wherein said opening in said upper housing of said valve has a substantially elliptical shape, and said plate of said bonnet has a shape substantially corresponding in geometry to said opening, said plate having greater length and width dimensions than said opening.

20. A bonnet assembly as defined in claim 19 wherein said bonnet clamp is adapted to engage said outer surface of said lip at each side of a narrow dimension of said opening.

21. A gate valve as defined in claim 16 wherein said plate of said bonnet has a gasket disposed around a rim thereof, wherein said gasket is compressed between said rim and said underside of said lip.

22. A bonnet assembly for a valve having an opening in an upper housing thereof, said valve further having a valve stem extending through said upper housing, the valve stem having a radially outwardly extending thrust collar disposed thereon, comprising:

a bonnet having a lower plate adapted to engage an underside of an inwardly extending lip of said inner housing said lip having a peripheral edge defining said opening, said bonnet further having an integral cylindrical neck extending upwardly from said plate, said cylindrical neck having an outer surface, an inner surface and an upper surface, said outer surface having an outer set of threads disposed thereon extending downwardly along said outer surface for a predetermined distance from said upper surface, said inner surface having an inner set of threads disposed thereon extending downwardly along said inner surface for a predetermined distance from said upper surface, said inner surface further having a radially inwardly extending flange having a bore therethrough, said bore having a diameter sufficient to permit said valve stem to extend therethrough, said flange being disposed at a predetermined distance below a lower extent of said inner threads, an inner portion of said neck further having a recess spanning said distance between said lower extent of said threads and an upper surface of said flange, said recess being larger in size than a diameter of said bore, said recess being of a size sufficient to receive said thrust collar of said valve stem therein;

means for clamping said lower plate of said bonnet in sealed engagement with said underside of said lip, said clamping means comprising ring means having threads disposed on an upper portion of an inner surface of said ring means for engaging said outer threads of said neck of said bonnet, said ring means further having means for engaging an upper surface of said lip of said upper housing extending downwardly from said upper threaded portion, and means for retaining said thrust collar of said valve stem within said recess in said bonnet thereby permitting said valve stem to be moved substantially only in a rotating manner, said retaining means comprising a bonnet cover means having a bore extending therethrough having a diameter slightly larger than a diameter of said valve stem, such that said bonnet cover means may be slipped over an upper portion of said valve stem, said cover means further having a lower external threaded portion adapted to engage and be threaded into said inner set of threads of said bonnet neck, said cover means further having a lower surface adapted to extend across a top portion of recess in said neck of said bonnet when said bonnet cover means is threaded into said bonnet, thereby preventing upward movement of said thrust collar and said valve stem; and wherein said ring means comprises a lower clamp ring and an upper lock ring, said lower clamp ring having a predetermined inner surface diameter wherein said clamp ring is adapted to be slipped over said neck into engagement with said outer surface of said lip without contacting said neck, and said lock ring comprises an upper internally threaded portion and a lower unthreaded portion, said unthreaded portion further having a lower surface adapted to engage an upper surface of said clamp ring in an abutting manner.

23. A bonnet assembly as defined in claim 22 wherein said opening in said upper housing of said valve has a substantially elliptical shape, and said plate of said bonnet has a shape substantially corresponding in geometry to said opening, said plate having greater length and width dimensions than said opening.

24. A bonnet assembly as defined in claim 23 wherein said clamp ring is adapted to engage said outer surface of said lip of said valve at each side of a narrow dimension of said opening.

25. A bonnet assembly as defined in claim 24 wherein said clamp ring has a pair of downwardly extending lugs adapted to be wedged into a gap between said neck of said bonnet and said inwardly extending lip portion of said upper housing.

* * * * *